United States Patent [19]

Cutlip

[11] Patent Number: 4,551,987
[45] Date of Patent: Nov. 12, 1985

[54] SOLAR ASSISTED HEAT PUMP HEATING AND COOLING SYSTEM

[75] Inventor: Larry D. Cutlip, Parkersburg, W. Va.

[73] Assignee: Sol-Chem, Inc., Parkersburg, W. Va.

[21] Appl. No.: 566,409

[22] Filed: Dec. 28, 1983

[51] Int. Cl.$^4$ ............................................. F25B 13/00
[52] U.S. Cl. .................... 62/324.5; 62/238.7; 62/263
[58] Field of Search ............... 62/238.6, 238.7, 324.5, 62/263, DIG. 16; 237/2 B

[56] References Cited

U.S. PATENT DOCUMENTS

| | | |
|---|---|---|
| 1,838,083 | 12/1931 | Del Mar . |
| 2,478,617 | 8/1949 | Anderegg ..................... 62/263 X |
| 2,845,253 | 7/1958 | Runte . |
| 3,128,610 | 4/1964 | Moore ............................. 62/263 |
| 3,563,304 | 2/1971 | McGrath ........................ 165/2 |
| 3,582,614 | 6/1971 | Zellers ......................... 219/345 |
| 4,012,920 | 3/1977 | Kirschbaum ................. 62/238.7 X |
| 4,030,312 | 6/1977 | Wallin et al. ................ 62/238.6 |
| 4,070,870 | 1/1978 | Bahel et al. ................. 62/235.1 |
| 4,202,493 | 5/1980 | Franchina .................... 237/2 B |
| 4,270,518 | 6/1981 | Bourne ........................ 62/238.7 X |
| 4,330,309 | 5/1982 | Robinson, Jr. ............... 62/181 |
| 4,336,692 | 6/1982 | Ecker et al. ................. 62/82 |
| 4,366,677 | 1/1983 | Uselton ....................... 62/157 |
| 4,375,831 | 3/1983 | Downing, Jr. ................ 62/238.7 X |
| 4,380,156 | 4/1983 | Ecker .......................... 62/238.7 X |
| 4,399,664 | 8/1983 | Derosier ...................... 62/238.7 |

Primary Examiner—Lloyd L. King
Attorney, Agent, or Firm—Harvey B. Jacobson

[57] ABSTRACT

A heating and cooling system for domestic and commercial use which includes a reversible refrigeration system in the form of a heat pump combined with an exteriorly mounted heat exchanger in the form of a solar collector and an interiorly mounted heat exchanger incorporated into a valance supported peripherally adjacent to but spaced downwardly from the ceiling of a space being conditioned. The refrigeration system includes a compressor and the heat exchange system includes a circulation water pump which together with the compressor constitute the major moving parts of the system with heat exchange and air circulation being obtained by convective airflow. The heating and cooling system is interconnected with the domestic hot water system to satisfy a large porportion of the required domestic hot water by utilizing rejected heat. The interiorly mounted valance heat exchanger dehumidifies the air in the space being conditioned to enable occupants of the space to feel cool and comfortable at a higher temperature setting. The exteriorly mounted heat exchanger utilizes a small quantity of atomized water in a fine mist spray during the cooling cycle for increasing the efficiency of the system. During extremely low ambient temperature conditions, the domestic hot water system supplies heat to the refrigeration system which prevents slugging of the refrigeration system compressor.

15 Claims, 6 Drawing Figures

4,551,987

SOLAR ASSISTED HEAT PUMP HEATING AND COOLING SYSTEM

BACKGROUND OF THE INVENTION

1. Field of the Invention

The present invention generally relates to a heat pump heating and cooling system utilizing a heat exchanger disposed exteriorly of a house or building and a heat exchanger located interiorly of a space to be conditioned in which the exterior heat exchanger is exposed to solar energy and in convective airflow heat exchange with exterior ambient conditions and the interior heat exchanger is incorporated into a valance system and includes facilities to provide convective air circulation and remove moisture and thus control the humidity of the air in the conditioned space. The heating and cooling system also includes an operative interconnection with the domestic hot water system for supplying hot water to the house or building so that normally wasted, rejected heat can be used to supply a substantial quantity of hot water and during extemely low ambient exterior temperature conditions, the hot water system may introduce supplemental heat into the system.

2. Description of the Prior Art

Heat pump heating and cooling systems have been utilized for many years and conventionally employ a heat exchanger mounted exteriorly of the house or building and a heat exchanger mounted interiorly thereof to maintain environmental conditions within the house or building at a comfortable level. Such heat exchangers usually have a blower or fan that is motor driven associated therewith to facilitate heat exchange between the heat exchange medium passing through the heat exchanger and air passing over, around or through the heat exchanger. These structures together with the refrigeration system and thermostatic controls have been employed with reasonable success but require substantial maintenance and are relatively high in initial cost due to the use of various drive motors, fans and other mechanisms. The following U.S. patents relate to this field of endeavor.

| | |
|---|---|
| 1,838,083 | 12-29-31 |
| 2,845,253 | 7-29-58 |
| 3,563,304 | 2-16-71 |
| 3,582,614 | 6-1-71 |
| 4,030,312 | 6-21-77 |
| 4,070,870 | 1-31-78 |
| 4,202,493 | 5-13-80 |
| 4,330,309 | 5-18-82 |
| 4,336,692 | 6-29-82 |
| 4,366,677 | 1-4-83 |

SUMMARY OF THE INVENTION

An object of the present invention is to provide a heating and cooling system utilizing a refrigeration system and more specifically a heat pump refrigeration system in which the exteriorly mounted heat exchanger is in the form of a solar collector and the interiorly mounted heat exchanger is in the form of a valance having the heat exchanger concealed with both the interiorly and exteriorly mounted heat exchangers being subjected to convective airflow thereby eliminating fans, blowers and the like and their accompanying motors.

Another object of the invention is to provide a heating and cooling system in accordance with the preceding object in which the interior heat exchanger includes a finned tube mounted behind a valance panel supported adjacent to but spaced below the ceiling of an enclosed space to be conditioned with the finned tube being supported above an open top drain trough for receiving, collecting and discharging moisture which may condense on the finned tube and drip therefrom when the interior heat exchanger is used to cool the air in the space.

A further object of the invention is to provide a heating and cooling system in accordance with the preceding objects in which the exterior heat exchanger is mounted on the roof or in another convenient area for exposure to the solar energy from the sun or from radiation from ambient atmosphere to provide a solar assisted heat pump.

Still another object of the invention is to provide a heating and cooling system in accordance with the preceding objects in which the exteriorly mounted heat exchanger is provided with an atomizer for discharge of a small volume of water in the form of an atomized mist so that evaporation of such atomized water will cool the exterior heat exchanger when extremely high ambient temperatures occur.

A still further object of the invention is to provide a heating and cooling system in accordance with the preceding objects in which the heat pump refrigeration system is connected with the domestic hot water system for the house, building or the like so that excess rejected heat which is normally wasted is utilized to supply a substantial quantity of hot water to the domestic hot water system and to enable the domestic hot water supply system to supply heat to the heat pump refrigeration system when ambient exterior temperature is quite low.

Yet another important object of the invention is to provide a heating and cooling system in accordance with the preceding objects which will utilize convective airflow thereby reducing the number of moving components which results in a reduction of initial cost as well as a reduction in maintenance' repair and replacement in which the system is efficient in operation and provides optimum environmental conditions within the space being conditioned.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
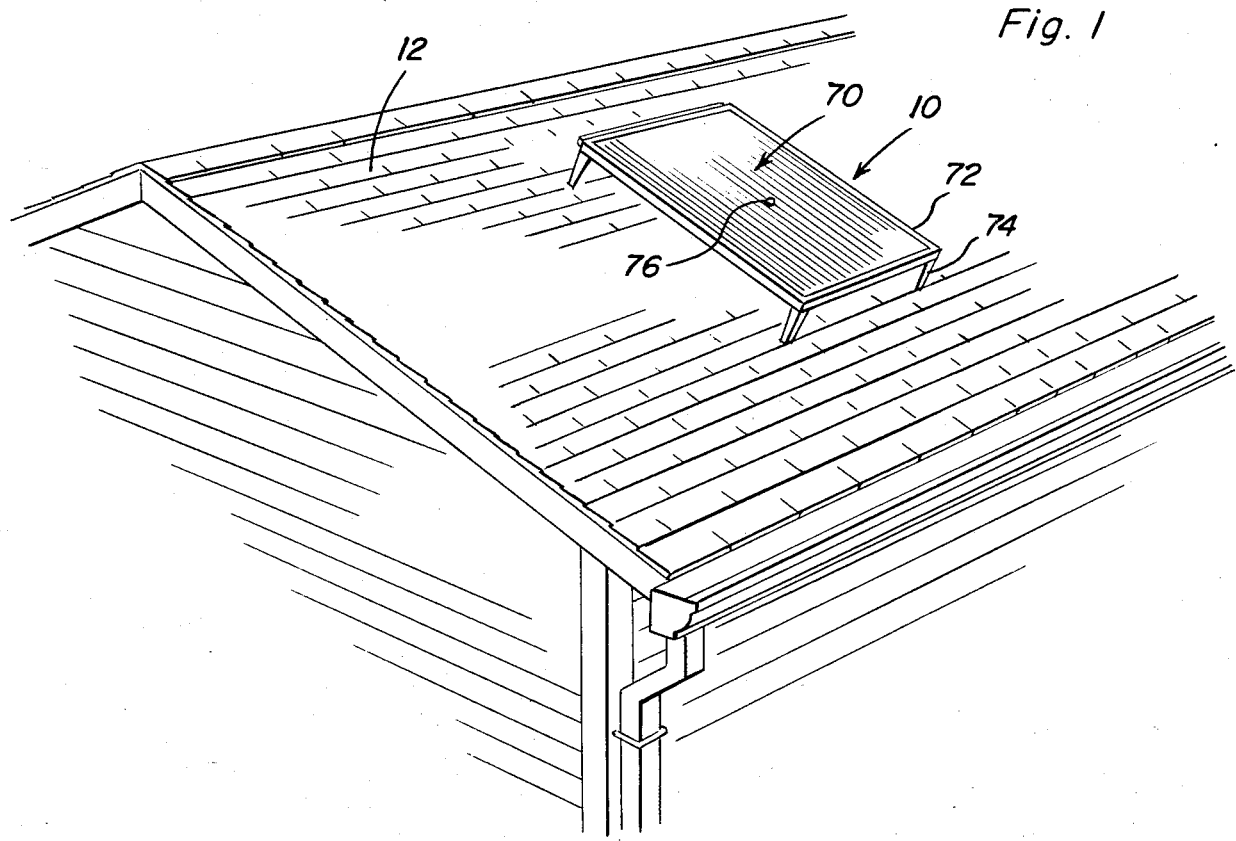
FIG. 1 is a perspective view of the exteriorly mounted heat exchanger incorporated into the heating and cooling system of the present invention positioned on the roof of a house or building.
Figure 2:
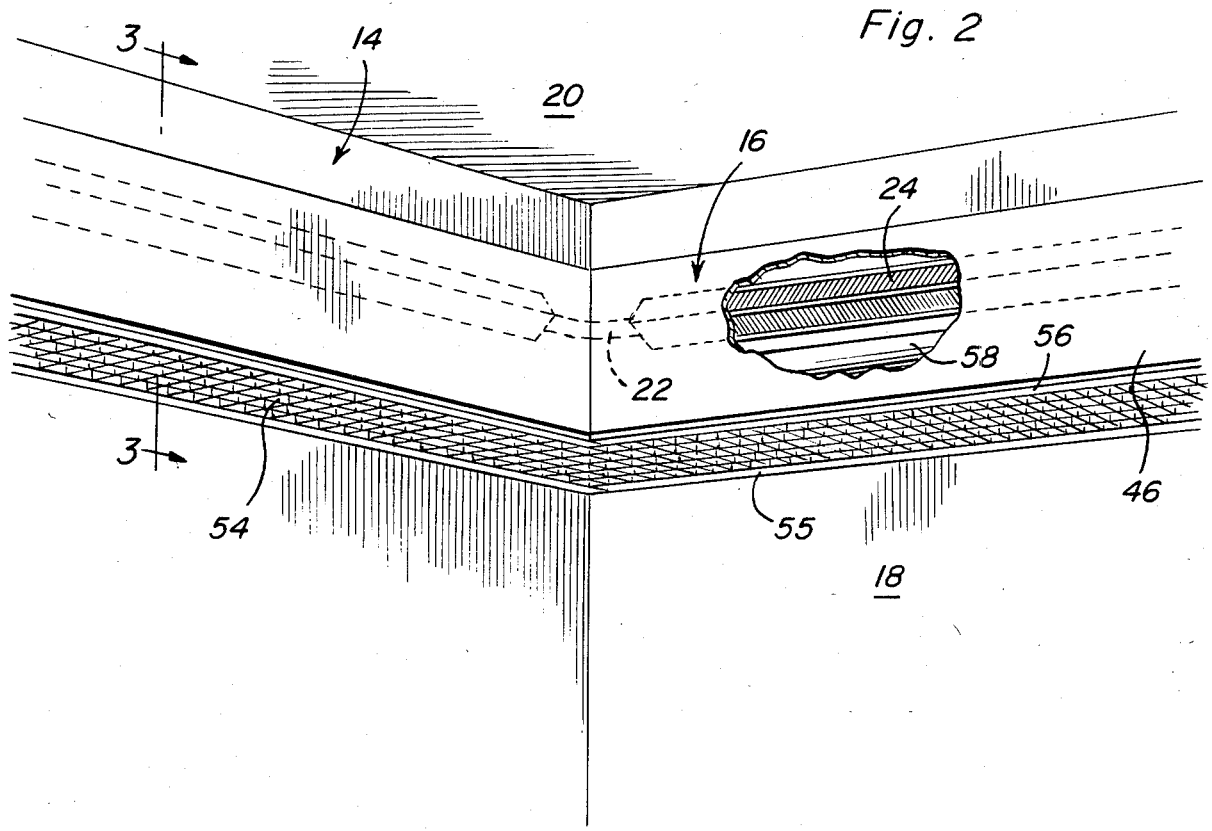
FIG. 2 is a perspective view of the interior heat exchanger associated with a valance.
Figure 5:
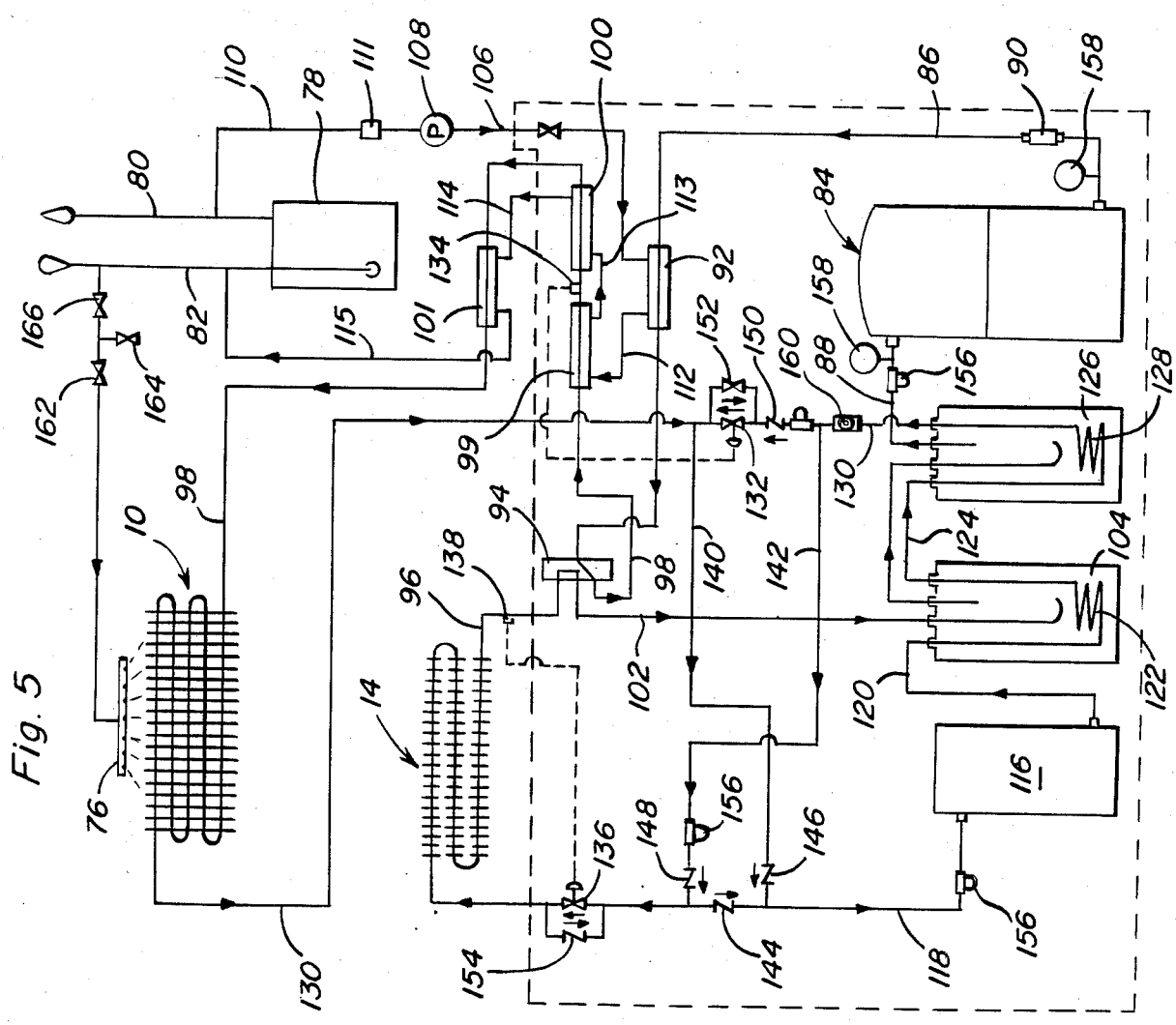
FIG. 5 is a schematic view of the heating and cooling system of the present invention illustrating the operative association of the components when in a cooling mode.
Figure 6:
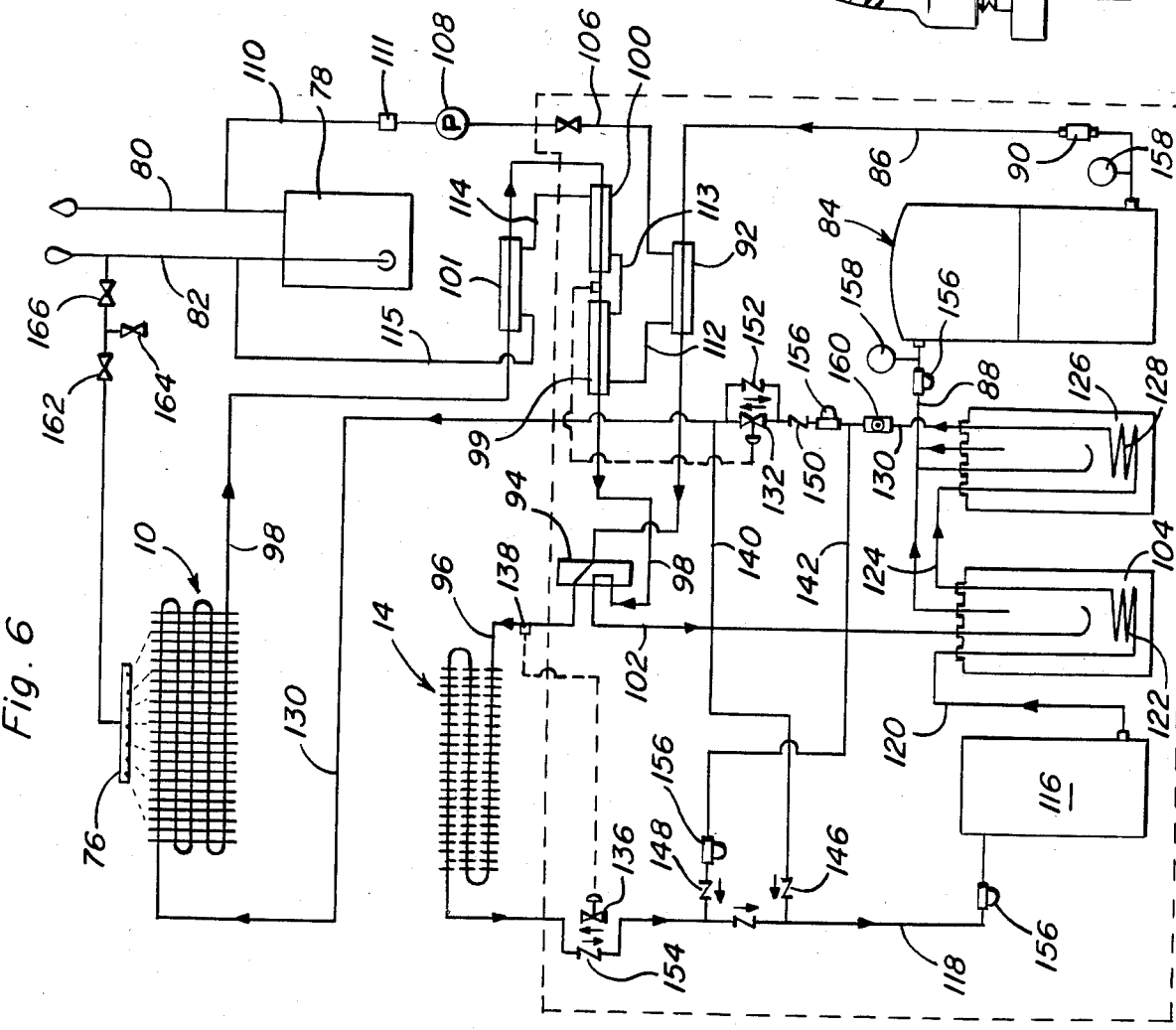
FIG. 6 is a schematic view of the heating and cooling system illustrating the operative association of the components when in a heating mode.

Referring now to the drawings, the heating and cooling system is illustrated schematically in FIGS. 5 and 6 and significant components thereof are illustrated in FIGS. 1–4 with FIG. 1 illustrating the exterior heat exchanger generally designated by the numeral 10 which is in the form of a solar collector mounted on a roof 12 or in any other suitable manner so that the heat exchanger 10 is exposed to the rays of the sun and also exposed to radiant energy from the surrounding ambient conditions. FIG. 2 illustrates the interior heat exchanger generally designated by the numeral 14 which is concealed behind a valance panel 16 supported in spaced relation to a wall surface 18 and below a ceiling 20. Both heat exchangers 10 and 14 are in heat exchange relation to the ambient air with convective airflow providing heat transfer between the refrigerant or other heat exchange medium passing through the heat exchangers to either heat or cool the air within the enclosed space defined by the walls 18 and ceiling 20 which may be the interior of a house or other suitable building in which it is desired to condition the enclosed air space so that the air space will be more comfortable for occupants or the conditions in the air space may be maintained at optimum temperature and humidity for any of many various purposes.

Figure 3:
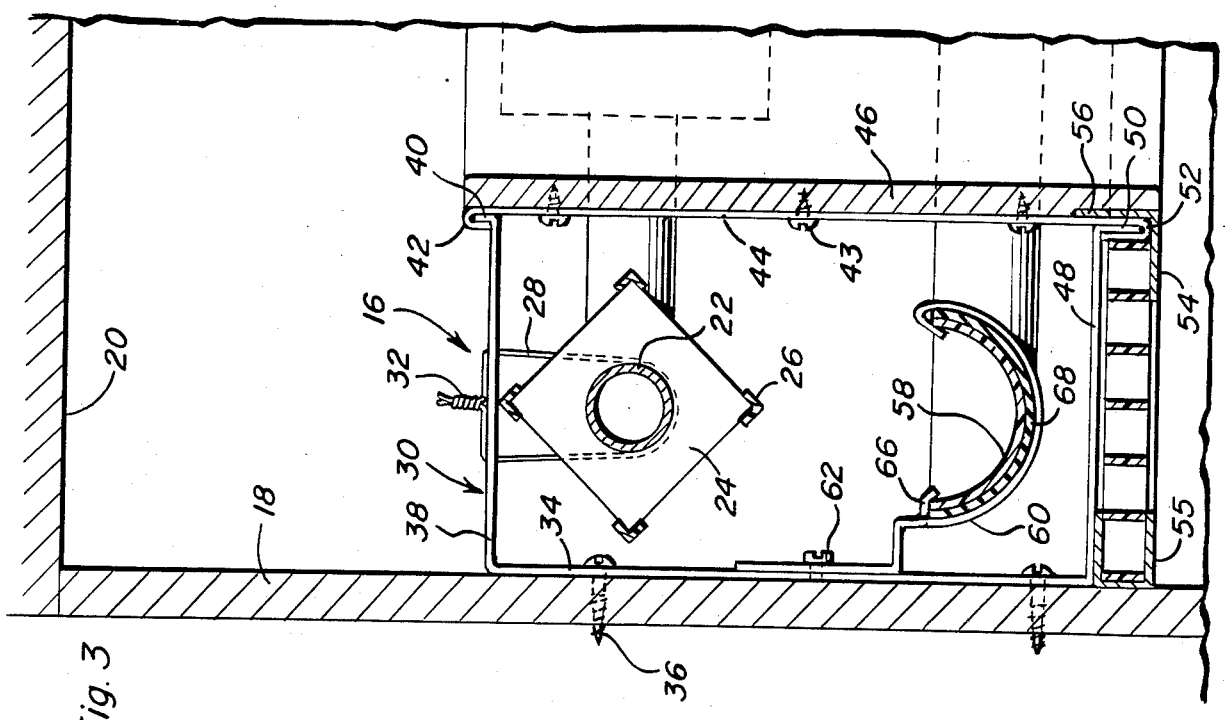
FIG. 3 is a vertical sectional view, on an enlarged scale, taken along section line 3—3 on FIG. 2 illustrating the specific structural details of the interior heat exchanger and the valance which conceals the components thereof.
Figure 4:
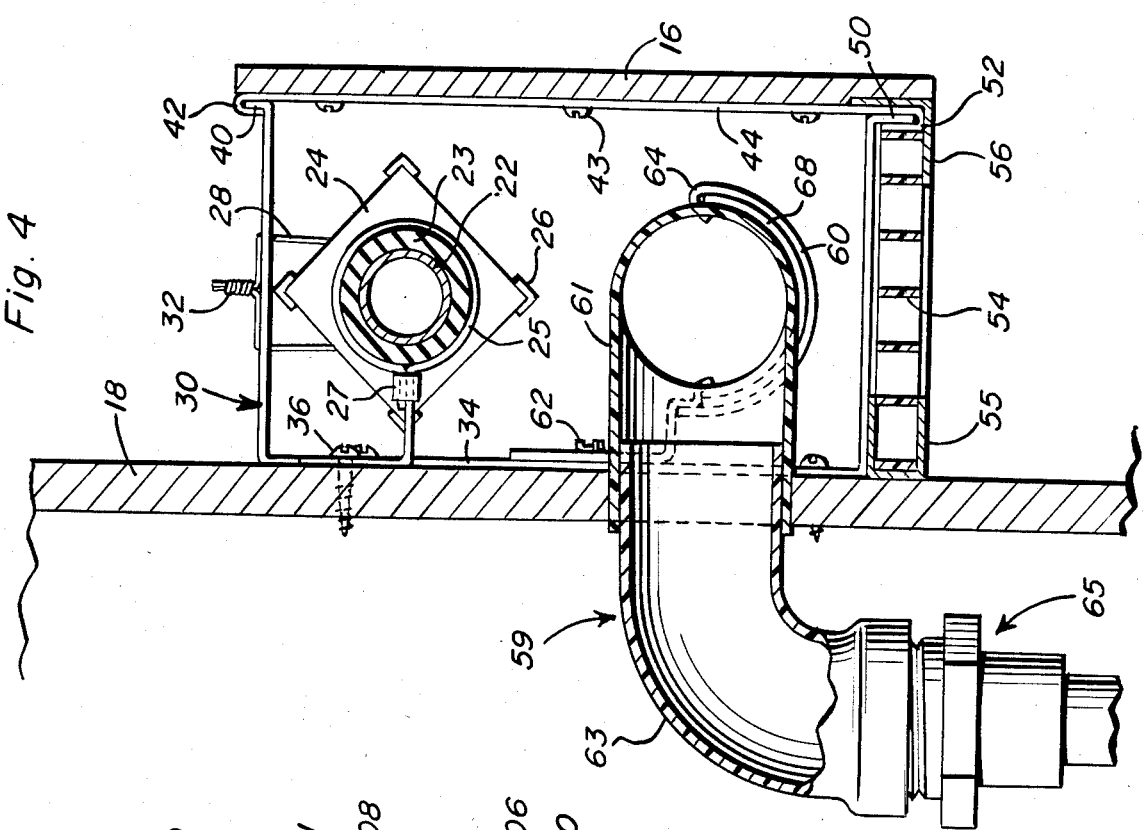
FIG. 4 is a sectional view similar to FIG. 3 illustrating additional details of the interior heat exchanger.

FIGS. 3 and 4 illustrate the specific details of the interior heat exchanger 14 which includes a continuous tube 22 having a plurality of fins 24 fixed thereto in a conventional manner for better heat exchange with ambient air. The fins 24 are square with the corners thereof being connected by longitudinal corner members 26 of right angular configuration to retain the fins 24 in spaced relation. The tube 22 is supported by a plurality of spaced wire supports 28 which extend up through a bracket structure generally designated by the numeral 30 with the terminal ends of the wires 28 being twisted as at 32 or otherwise connected to support the tube 22 securely from the bracket 30.

The bracket 30 includes a vertical member 34 in the form of a metal strap or the like secured to the wall 18 by screw-threaded fasteners 36 or any other suitable fastening means. The upper end of the vertical strap 34 is provided with a horizontal strap 38 integral therewith which has spaced apertures that receive the end portions of the supporting wires 28. The outer end of the strap 38 is turned upwardly as at 40 to receive the reversely bent end portion 42 of a vertical strap 44 that is supportingly connected to the valance 16 by screws 43 or other fasteners. The valance 16 is in the form of a panel 46 of wood, plastic or any other suitable material that may be used in association with drapes or may be in the form of a decorative panel of any type. The lower end of the vertical strap 34 is provided with a horizontal strap 48 which terminates in a downwardly extending flange 50 received in a reversely curved lower edge 52 of the strap 44 thus detachably securing the strap 44 to the straps 38 and 48 since the metal horizontal straps 38 and 48 may be deflected inwardly to disengage the strip 44 and thus the valance 16 from the bracket 30. A grille 54 in the form of a grid member of plastic or the like is supported below the horizontal straps 48 to conceal the bottom portion of the interior heat exchanger 14 and to provide convective airflow between the wall 18 and the valance 16. The grille 54 is supported by a channel-shaped bracket 55 attached to the wall 18 at the inner edge and a continuous L-shaped member 56 at its outer edge with one leg of the member 56 being frictionally held between the outer surface of the strap 44 and the valance 16. Screw threaded fasteners or other suitable fastening means may be provided for securing the grid 54 to the bracket 30.

When the interior heat exchanger 14 is in a cooling mode, moisture will normally be condensed onto the surface of the fins 24 and the tube 22. In order to collect any moisture which drips from the finned tube 22, an elongated trough 58 which may be constructed of plastic material such as PVC is supported with a predetermined fall or inclination so that any moisture collected in the trough 58 will drain to one end or the center thereof for discharge through a drain assembly 59 that may by concealed within the wall structure. The trough 58 is supported by a U-shaped bracket 60 secured to the vertical strap 34 of the bracket 30 by fastening devices 62 or the like with the outer end of the bracket 60 being reversely curved as at 64 to hook over the edge of the trough 58. The inner edge of the bracket 60 is provided with a struck-out, bendable tab 66 which overlies and engages the other edge of the trough 58 thereby securing the trough 58 in the generally U-shaped portion of the bracket 60. Interposed between the trough 58 and the bracket 60 is a cushioning element of rubber or other resilient insulating material 68 to eliminate noise and to provide resilient frictional engagement between the edges of the trough and the reversely bent end 64 and the tab 66 respectively. Thus, any moisture condensed on the fins 24 or the tube 22 will drop into the trough 58, drain to the drain assembly 59 and be disposed of in any suitable manner. The grid 54 and the specific orientation of the valance 16 in relation to the wall 18 and ceiling 20 facilitates convective airflow when the interior heat exchanger 14 is in the heating mode or in the cooling mode due to the temperature differential between the heat exchanger 14 and ambient air. The materials from which the tube 22 and fins 24 are constructed are conventional materials used in fin-type heat exchangers. In those areas of the tube 22 not having the fins thereon, such as at junctures, any portions of the tube 22 which are exposed is provided with an insulation sleeve 23 with brackets 25 being connected to the wall by suitable fasteners. Each bracket 25 is a metal strap looped around the sleeve 23 with the free end of the strap being held in place by a sliding loop-type fastener 27 as shown in FIG. 4 to reduce vibration.

The drain assembly 59 includes a T-fitting 61 connected with and extending laterally from the trough 58 and which is connected to an ell 63 or other fitting and a reducer and drain tube assembly 65 as shown in FIG. 4.

The exterior heat exchanger 10 is a conventional tube-type solar collector in the form of a continuous serpentine tube or constructed with a continuous serpentine passageway for flow of refrigerant or other heat exchange medium therethrough with the solar collector panel being conventional in and of itself and designated generally by reference numeral 70 with the panel being supported by a frame 72 and supporting leg structure 74 or the like with the details of the solar colletor not forming part of the present invention. However, the present invention does include the use of an atomizer 76 generally in the form of a fine spray nozzle to form a water mist associated with the upper surface of the solar collector panel 70 in order to discharge the mist or atomized spray of water onto the surface of the solar collector panel 70 when the heating and cooling system is in a cooling mode and the ambient temperature associated with the exterior heat exchanger 10 is relatively high so that evaporation of the mist or atomized water will cool the solar panel 70. The particular manner in which the components are supported and associated with existing building structures may vary but significantly, neither the exterior heat exchanger 10 nor the interior heat exchanger 14 requires the use of fans, blowers, motors and attendant controls thereby maintaining an initial low cost for the system and eliminating substantial maintenance, repair and replacement costs.

FIGS. 5 and 6 illustrate schematically the system of the present invention including its connection with a domestic hot water heater 78 of conventional construction for supplying domestic hot water to the house or building. The hot water heater 78 includes the usual hot water outlet 80 which extends to and is connected with the hot water utilizing components in the house or building and is also provided with a cold water supply line 82 in a conventional manner with the usual controls being provided to mainthe temperature of the water in the heater 78 within certain limits.

Also, the heating and cooling system includes a heat pump refrigeration system in which the heat exchangers 10 and 14 are components and which serve alternately as evaporators and condensers in the refrigeration system which also includes a compressor 84 which includes a discharge line 86 for hot gaseous refrigerant and a suction line 88 for return of refrigerant to the compressor 84. The discharge line 86 is provided with a discharge muffler 90 and extends through a heat exchanger 92 to a reversing valve 94 with the reversing valve being communicated either with the interior heat exchanger 14 through line 96 or with the exterior heat exchanger 10 through line 98. The line 98 passes through heat exchangers 99, 100 and 101 between reversing valve 94 and the exterior heat exchanger 10. The reversing valve 94 also selectively communicates with a line 102 which extends to an accumulator heat exchanger 104. The heat exchanger 92 associated with the discharge line 86 is provided with a water flow line 106 at one end thereof which has a pump 108 incorporated therein and which is connected to one hot water tank 78 through a water line 110 with an aquastat 111 which prevents overheating of the heater during the cooling mode which may result in rupture of the safety fuse link in a gas water heater. The other end of the heat exchanger 92 includes a water line 112 which interconnects the heat exchanger 92 and one end of the heat exchanger 99 with the other end of the heat exchanger 99 including a water flow line 113 which extends to and connects with one end of heat exchanger 100. A water flow line 114 extends from and connects the other end of heat exchanger 100 with one end of heat exchanger 101 and a water flow line 115 connects the other end of heater exchanger 110 with the water supply line 82.

In addition to the accumulator heat exchanger 104, the system includes a liquid receiver 116 that is communicated with the interior heat exchanger 14 through line 118 and communicated with the accumulator heat exchanger through line 120. The line 120 extends into and communicates with a heat exchange coil 122 and then extends outwardly of the accumulator heat exchanger through line 124 into an accumulator heat exchanger 126 and is in communication with the heat exchange coil 128 therein which then discharges therefrom into line 130 which extends to and communicates with the exterior heat exchanger 10 so that the heat exchanger 10 thus includes two refrigerant lines, 98 and 130 and the heat exchanger 14 includes two refrigerant lines 96 and 118. The line 130 is provided with a control valve 132 therein which is controlled from a sensor 134 associated with the refrigerant line 98 between heat exchanger 99 and 100 and the line 118 has a control valve 136 therein controlled from a sensor 138 associated with the refrigerant line 96. Interconnecting the lines 130 and 118 is a pair of crossover lines 140 and 142 which are connected to the line 130 on opposite sides of the control valve 132. The other ends of the lines 140 and 142 cross over each other and are connected to the line 118 on opposite sides of a check valve 144. Each of the lines 140 and 142 also includes a check valve 146 and 148 respectively and a check valve 150 is positioned between the valve 132 and the connection between lines 142 and 130. Also, each of the control valves 132 and 136 includes a check valve 152 and 154 respectively in a bypass line which has a flow direction opposite to the respective valves 132 and 136 as indicated by the directonal arrows. Various of the flow lines have filters as indicated by numeral 156 and pressure gauges 158 are provided on the discharge and suction side of the compressor 84 in a conventional manner and a sight glass 160 is provided in the line 130. Also, a valve is provided in the water flow line 106 for controlling flow through the heat exchangers. A pressure operated control valve 162 in the water line which connects the cold water supply 82 with the atomizer 76 controls flow to the atomizer in response to compressor head pressure and a drain valve 164 is provided to drain the nozzle 76 when desired and when solenoid valve 166 is closed.

When the heat pump is in a cooling mode, the reversing valve 94 will be in the position illustrated in FIG. 5 with the control thermostat (not shown) controlling the position of the reversing valve so that it will be positioned as illustrated in FIG. 5 when in he cooling mode. In this position, hot refrigerant passes through line 86 and through the reversing valve 94 and line 98 and into the exterior heat exchanger 10 which serves as a condenser. Also, the hot refrigerant passing through line 86 passes through heat exchanger 92 and then through heat exchangers 99, 100 and 101 so that water passing through the all the heat exchangers will be heated thereby providing a substantial portion of the hot water needed for domestic hot water purposes. After the hot refrigerant passes through the exterior heat exchanger 10 which is acting as a condenser, the cooled refrigerant returns through line 130 into line 140 upstream of check valve 150 and into the line 118 downstream of check valve 144 and thus into the liquid receiver 116 and subsequently through the accumulator heat exchanger coils 122 and 128 and then into the line 130 downstream of the valve 132 with the condensed refrigerant then passing through line 142 into the line 118 upstream of check valve 144 and then through the control valve 136 into the interior heat exchanger 14 which is acting as an evaporator so that the liquid refrigerant expanding through the valve 136 will absorb heat from the enclosed space in which the interior heat exchanger 14 is disposed. The expanded refrigerant then passes through line 96, through reversing valve 94 into line 102 and then through the accumulators 104 and 126 into the suction line 88 and back to the compressor 84 thus completing the cycle.

When the heating and cooling system is in the heating mode and demand for heat is made by the thermostatic control, as shown in FIG. 6, the reversing valve 94 is shifted so that line 98 will be communicated with line 102 and line 86 is communicated with line 96. Thus, hot gaseous refrigerant from the compressor passes through line 86, heat exchanger reversing valve 94 line 96 and the interior heat exchanger 14 which is then acting as a condenser. The cooled refrigerant leaving the interior heat exchanger 14 which is acting as a condenser passes through check valve 154 around control valve 136 in line 118 and into liquid receiver 116 and through the heat exchanger coil 122 and 128 and then into line 130, through the control valve 132 and into the exterior heat exchanger 10 which is now acting as an evaporator for absorbing heat from the ambient atmosphere and vaporizing the liquid refrigerant passing through the heat exchanger 10 with the hot gaseous refrigerant then passing through line 98, back through heat exchangers 101, 100 and 99 and into the reversing valve 94 and then into line 102 for serial passage through the accumulator heat exchanger 104 and 126 and then back through the suction line 88 to the compressor 84. If additional heat or supplemental heat is required, the water valve and pump 108 to the heat exchangers 92, 99, 100 and 101 may be manipulated to provide flow of warm or hot water through the heat exchangers to introduce supplemental heat to the refrigerant which may be necessary when the ambient temperature associated with the external heat exchanger, acting as an evaporator, is quite low and will not effectively evaporate all of the refrigerant.

The atomizer 76 is operative when the system is in a cooling mode and the ambient air is quite hot. The fine mist spray introduced onto the solar collector will reduce the temperature of the solar collector and enable the exterior heat exchanger 10 to operate more effectively as a condenser. The quantity of water discharged through the atomizer 76 may be quite small since the water will extract the heat of vaporization from the refrigerant passing through the solar collector thereby rendering the system more efficient when in the cooling mode. The flow of water to the atomizer is controlled by a pressure sensitive device which monitors the head pressure in the system and it has been found that the atomizer may be cycled on and off in response to 40 PSI differential in the head pressure. The aquastat 111 is used in the cooling mode to prevent overheating of the water which could cause an unsafe condition and damage the heater or cause the fusible safety link in a gas-fired water heater to be ruptured.

The outside heat exchanger can be bypassed and some other type of heat sink, such as a swimming pool or the like, may be used to supply heat or to utilize rejected heat. Likewise, the reject heat or energy may be used with other energy users such as to drive a turbine-generator to produce electrical energy. Protective controls may be provided to control efficiency of operation. For example, an outside ambient temperature sensing device can be used to shutdown the water flow or otherwise control water flow when in a heating mode and the outside temperature is extremely low so that freeze up in the return line from the outside heat exchanger will not occur.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claim as new is as follows:

1. A heating and cooling system comprising a heat pump refrigeration system including an exteriorly mounted heat exchanger, an interiorly mounted heat exchanger, a compressor assembly, an expansion device associate with each heat exchanger and a reversing valve to control refrigerant flow whereby said heat exchangers may be selectively operated as a condenser and evaporator, said interior heat exchanger being horizontally elongated and extending along at least a portion of the wall of an enclosed space to be conditioned and mounted in spaced but adjacent relation to the wall and in spaced but adjacent relation to a ceiling, a generally rigid valance panel mounted in concealing relation to the interior heat exchanger and in spaced relation to the wall and ceiling to provide convective flow of ambient air over the interior heat exchanger, and condensate collecting and drain means below the interior heat exchanger in concealed relation behind the valance panel, said valance panel having a top edge oriented slightly above the heat exchanger and a bottom edge disposed a short distance below the condensate collecting and drain means.

2. The system as defined in claim 1 wherein said condensate collecting and drain means includes an open top trough, bracket means supporting the trough with a slight incline toward a drain pipe to drain liquid to a discharge point.

3. The system as defined in claim 2 wherein said interior heat exchanger includes a single tube with a plurality of fins of square configuration mounted thereon, a retaining strip interconnecting the corners of the fins to retain them in spaced relation, one corner of the fins being disposed centrally below the tube and centrally above the trough.

4. The system as defined in claim 3 wherein said bracket means includes a metal strap shaped to conform to and underlie the trough with the strap having an inwardly reversely bent end hooked over one edge of the trough, an opposite portion of the strap having an outwardly struck tang engaging the other edge of the trough.

5. The system as defined in claim 4 wherein said strap is provided with a resilient cushion on the upper surface thereof in engagement with the trough, said trough and bracket being generally U-shaped in configuration with one leg of the strap being connected to the wall of the space being conditioned.

6. The system as defined in claim 1 wherein said interior heat exchanger includes a bracket attached to the wall of the space being conditioned, said bracket including an upper and lower outwardly extending strap, said straps being generally rigid but deflectable, means on the upper strap suspending the interior heat exchanger, means on the outer ends of the straps in supporting engagement with the valance panel, and a grid member supported between the lower edge of the valance panel and the wall to enable convective air flow.

7. The system as defined in claim 1 together with a domestic hot water heater, heat exchangers associated with refrigerant flow lines in the refrigeration system to enable rejected heat from the system to be used to heat water for domestic hot water use and to enable the domestic hot water heater to add supplemental heat to the refrigeration system when required.

8. The system as defined in claim 7 together with a water circulating pump between the hot water heater and the heat exchangers associated with the refrigerant flow lines to provide adequate water flow for heat exchange in the heat exchangers.

9. The system as defined in claim 1 wherein said exterior heat exchanger is a solar collector exposed to the sun rays amd ambient atmospheric conditions, and a water atomizer associated with the solar collector to discharge a small quantity of water thereon in the form of an atomized mist when ambient temperature is high to enable heat to be exchanged to the atmosphere to cool the exterior heat exchanger.

10. In combination with an enclosed space defined by vertical walls, a ceiling and floor, a heat exchanger mounted in said space to heat or cool the air in the space by circulating a heat exchange medium through the heat exchanger with temperature changes in the air in contact with the heat exchanger causing flow of air over the heat exchanger and circulation of air in the space, said heat exchanger being horizontally elongated, means mounting said heat exchanger from the wall adjacent the ceiling and a valance panel supported inwardly of the heat exchanger in adjacent spaced concealing relation thereto, said valance panel being adjacent to but spaced from the ceiling to enable air circulation between the panel and ceiling and between the panel and wall for heat exchange with the heat exchange medium in the heat exchanger.

11. The combination as defined in claim 10 wherein said heat exchanger is an elongated finned tube, a condensate trough having an elongate open top extending throughout the length of the heat exchanger, means supporting said trough with a longitudinal incline to cause condensate to collect at a low point, and drain means connected with said trough at the low point for draining condensate therefrom.

12. The combination as defined in claim 11 together with a grid panel filling the space between the lower edge of the valance panel and the wall to conceal the heat exchanger and trough while permitting airflow between the wall and valance in heat exchange relation to the heat exchanger.

13. The combination as defined in claim 10 wherein said heat exchanger is a component of a heat pump refrigeration system including an exterior heat exchanger, a compressor assembly, an expansion device for each heat exchanger and a reversing valve enabling selective function of the heat exchangers as an evaporator or condenser, said external heat exchanger comprising a solar panel in heat exchange relation to ambient atmosphere and exposed to the rays of the sun, and a water atomizer positioned to discharge atomized water onto the solar panel when ambient temperature is high.

14. The combination as defined in claim 12 wherein said heat exchanger is a component of a heat pump refrigeration system including an exterior heat exchanger, a compressor assembly, an expansion device for each heat exchanger and a reversing valve enabling selective function of the heat exchangers as an evaporator or condenser, said external heat exchanger comprising a solar panel in heat exchange relation to ambient atmosphere and exposed to the rays of the sun, and a water atomizer positioned to discharge atomized water onto the solar panel when ambient temperature is high.

15. The combination as defined in claim 10 wherein said heat exchanger is a component of a heat pump refrigeration system including an exterior heat exchanger, a compressor assembly, an expansion device for each heat exchanger and a reversing valve enabling selective function of the heat exchangers as an evaporator or condenser, a domestic hot water heater, supplemental heat exchange means in heat exchange relation to refrigerant lines between the heat exchangers and compressor assembly, water circulating means communicating the hot water heater with the supplemental heat exchange means, and control means associated with said water circulating means to utilize heat rejected from the enclosed space to heat water in the hot water heater when the enclosed space is being cooled and to add heat from the hot water heater to the refrigeration system when the enclosed space is being heated and the exterior heat exchanger cannot supply adequate heat due to low ambient temperature.

* * * * *